(12) United States Patent
Kytölä

(10) Patent No.: US 7,328,721 B2
(45) Date of Patent: Feb. 12, 2008

(54) FLOW RATE CONTROLLER

(75) Inventor: Olli Kytölä, Muurame (FI)

(73) Assignee: Instrumenttitehdas Kytola Oy, Muurame (FI)

( * ) Notice: Subject to any disclaimer, the term of this patent is extended or adjusted under 35 U.S.C. 154(b) by 234 days.

(21) Appl. No.: 11/186,795

(22) Filed: Jul. 22, 2005

(65) Prior Publication Data
US 2006/0016490 A1    Jan. 26, 2006

(30) Foreign Application Priority Data
Jul. 23, 2004   (FI)   .................... 20041019

(51) Int. Cl.
*F16K 11/22* (2006.01)
*G01F 15/18* (2006.01)
(52) U.S. Cl. .................... 137/599.13; 73/201
(58) Field of Classification Search ........... 137/597, 137/599.13, 601.19; 73/197, 198, 201
See application file for complete search history.

(56) References Cited

U.S. PATENT DOCUMENTS

| 1,232,180 | A | * | 7/1917 | Barnes .................. 137/527.8 |
| 3,296,859 | A | | 1/1967 | Stewart |
| 3,438,397 | A | | 4/1969 | Gilpin |
| 3,444,724 | A | | 5/1969 | Gilpin |
| 3,908,688 | A | * | 9/1975 | Gandrud .................. 137/110 |
| 5,000,041 | A | * | 3/1991 | Miyamoto et al. .......... 73/197 |
| 5,088,322 | A | * | 2/1992 | Fitzpatrick et al. .......... 73/197 |
| 5,962,780 | A | * | 10/1999 | Prouvost .................. 73/198 |

* cited by examiner

*Primary Examiner*—Stephen M. Hepperle
(74) *Attorney, Agent, or Firm*—Young & Thompson

(57) ABSTRACT

A flow rate controller for controlling the flow of a medium, includes an incoming channel, a measuring chamber, a running flow channel connecting the incoming channel and the measuring chamber, a control valve acting in the running flow channel, and an outflow channel for the controlled flow. A necessary flow channel leads from the incoming channel to the measuring chamber. There is a flow adjusting in the necessary flow channel. A service flow channel leads from the necessary flow channel to the outflow channel. In addition, the flow rate includes comprises control elements for leading the flow from the necessary flow channel selectively into the measuring chamber and service flow channel, respectively.

2 Claims, 2 Drawing Sheets

FLOW RATE CONTROLLER

The present invention relates to a flow rate controller, for adjusting, for example, the lubrication of an apparatus to a desired value, and for monitoring the maintaining of the flow. Flow rate controllers of this type are used for controlling, for example, the circulation of lubrication in big machineries, and for monitoring the maintaining of the lubrication circulation. Such machineries could be, for example, various sub-assemblies of a paper machine. These machineries are designed to remain operational uninterrupted for long periods at a time, whereby all their sub-assemblies need to stay reliably operational during these periods. Means for maintaining the lubrication of the machinery is a part of crucial equipment that has to remain reliable for the entire operational period.

Conventional devices for controlling and monitoring lubrication circulation are such that the lubrication flow for a certain device passes through the controlling device, said devices comprising means for controlling the flow. Such a device also comprises measuring means for indicating the volume of the flow passing through the device. A controlling device is used for controlling the passing flow to reach a target value, which is indicated by a measuring tool. It is essential for the functioning of the device that the measuring tool indicates the actual flow volume reliably for the duration of the long period of operation of the apparatus. In terms of reliability it is required to revise the functioning of the device periodically, for which the measuring means has to be detached from the controlling device. The measuring tool also has to be detachable in case of an obvious breakdown of the device.

These problems have been solved by means of a flow rate controller in accordance with the invention, comprising an incoming channel for the medium, a measuring chamber, an running flow channel connecting the incoming channel and the measuring chamber, a control valve acting in the running flow channel, and an outflow channel for the controlled flow. The flow rate controller is characterized in that it besides the running flow channel incorporates a necessary flow channel from the incoming channel to the measuring chamber, a flow adjusting means in the necessary flow channel, and additionally, a service flow channel from the necessary flow channel to the outflow channel, as well as control means for directing the flow from the necessary flow channel selectively to the measuring chamber, respectively to the service flow channel.

Figure 1:
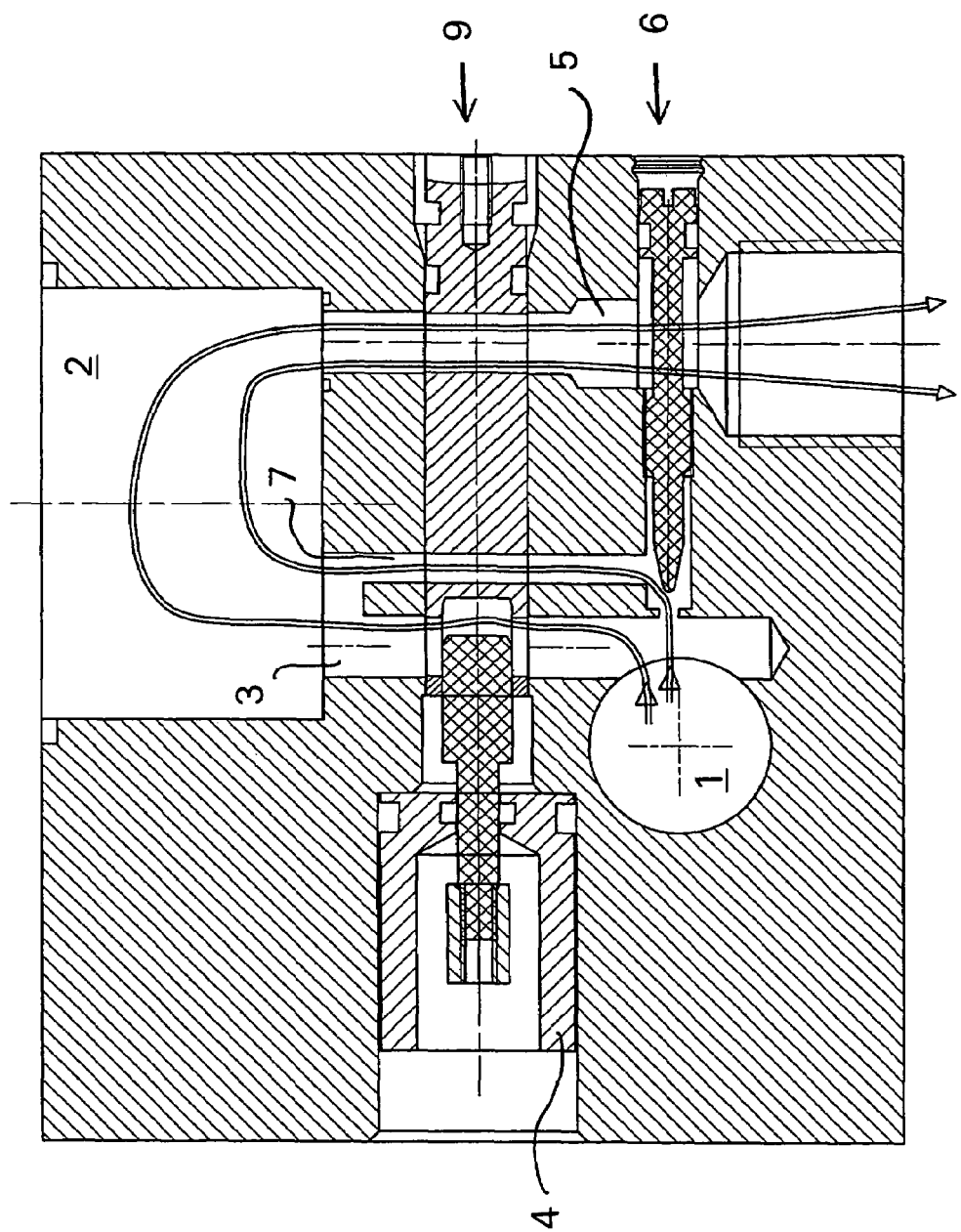
Figure 2:
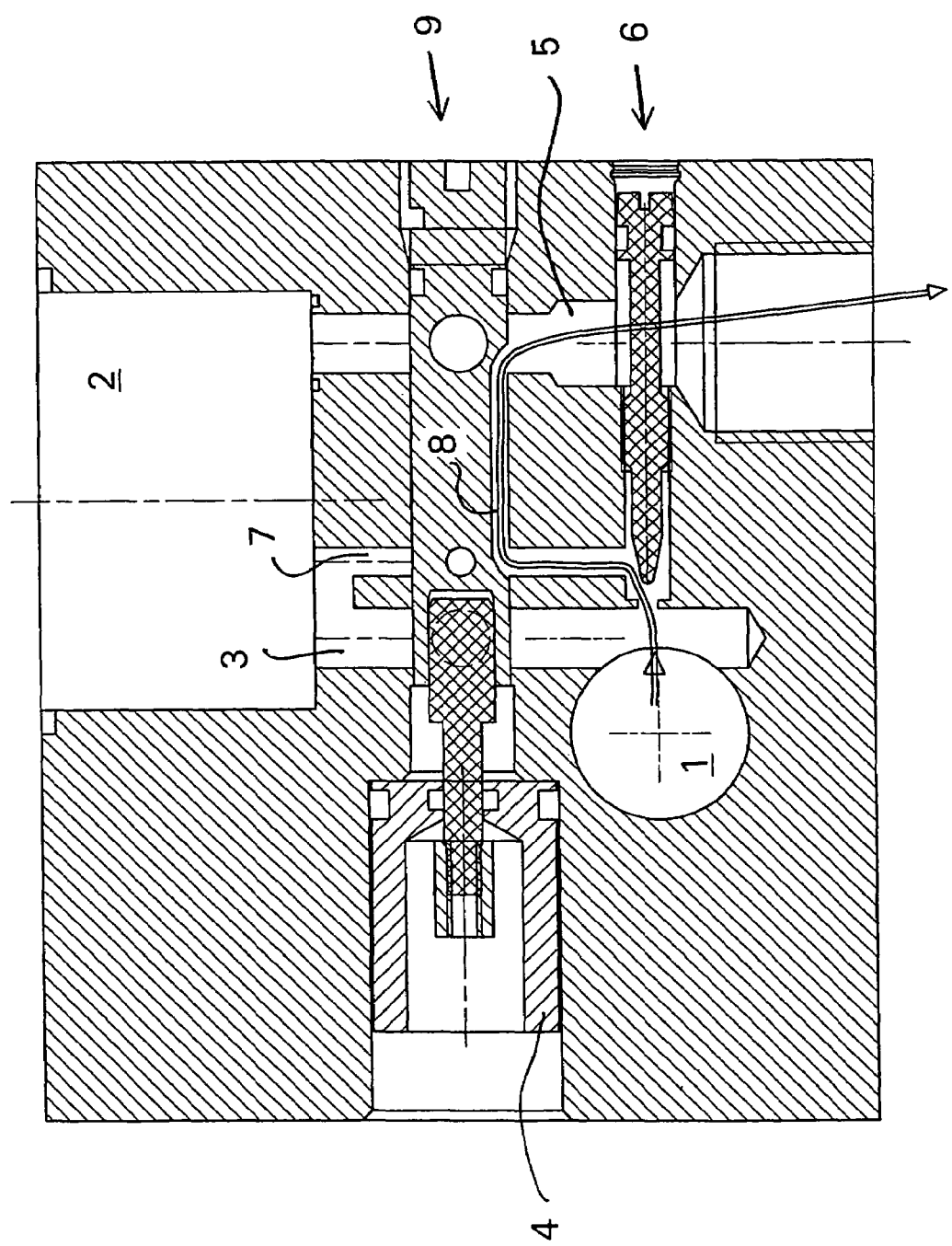

The invention will be described in more detail in the following, with reference to the enclosed drawings, wherein FIG. 1 is a schematic cross-sectional view of a flow rate controller according to the invention, having its components in the normal position of operation, and FIG. 2 is the same view of the flow rate controller with the components set to service position.

FIG. 1 is a schematic cross-sectional view of a flow rate controller, wherein various channels and device chambers have been worked into a solid body section, arranged mutually in a certain way to form flow connections and equipped with appropriate means for controlling or leading the flow passing through the channels.

Firstly, an incoming channel 1 has been formed to the body for the flow of the medium, which is lead through the flow rate controller and controlled therein. Secondly, a chamber 2 for the flow-measuring tool has been formed into the body. The measuring tool is not shown in the figure, but a conventional, pinion-type flow meter, equipped with a flow volume display and eventually with a summing counter can be used. The incoming channel 1 is connected with the measuring tool chamber 2 by means of an running flow channel 3, into which a control valve 4 has been arranged. During the operational use of the flow meter, the flow of the medium flowing in the running flow channel 3 is controlled by means of the control valve 4, based on information provided by the measuring tool located in the chamber 2. This control can be performed manually, or alternatively automatically based on a signal provided by the measuring tool in the chamber 2. The controlled flow is lead through the control valve to a receiving device, such as the object to be lubricated, through the outflow channel 5.

In addition to the basic structure described above, the flow rate controller comprises another channel leading from the incoming channel to the measuring tool chamber, in other words the necessary flow channel 7. The flow passing through this necessary flow channel is also subject to the control of the measuring tool in the chamber 2. The necessary flow channel 7 has its own flow adjusting tool 6, by means of which the flow passing through the determination flow channel can be controlled, and set to a target value determined by this control. The flow in the necessary flow channel can be set to a certain value by closing the control valve 4, whereby the flow indicated by the measuring tool in the chamber 2 passes through the necessary flow channel 7 entirely. This flow is set to a certain value, which is satisfactory for the equipment for the duration of maintenance of the flow rate controller.

A service flow channel 8 is provided parallel to the determination flow channel 7. The flows can be selectively determined either through channel 7, or channel 8, with a controlling means 9, in this connection referred to as maintenance valve because of some of its special functions. In the described embodiment, the maintenance valve 9 is in connection with channels associated with control operations of the flow rate controller, the running flow channel 3, the necessary flow channel 7, the outflow channel 5, and the service flow channel 8. Thereby, the maintenance valve 9 has been constructed in such a way that in its certain turning position with respect to its longitudinal axis, the valve allows the flow in the running flow channel, the volume of the flow having been determined by the control valve 4. It allows also the flow through the necessary flow channel 7, the volume of the flow having been determined by the flow control 6. It also allows an unrestricted flow through the outflow channel 5. Instead, the flow through the service flow channel 8 can be cut off. In a position where the maintenance valve 9 has been rotated 90° with respect to its longitudinal axis, the open flow channels mentioned above are closed and, correspondingly, the service flow channel 8 is opened, and the maintenance flow, controlled and set by means of the flow control tool 6 and the measuring tool in the chamber 2, is led to the outflow channel 5. Instead, flows to the chamber 2 have been cut off, and the measuring tool in the chamber can be removed for maintenance or repair.

The construction of the maintenance valve described herein, and the position of the branching point of the determination flow channel 7, also allow the control valve 4 to be removed for repair or maintenance operations when the maintenance valve has been set to the maintenance position, as described above.

Naturally, the flow led to the necessary flow channel 7 has to be controlled in such a way that a minimum flow allowed for the operation of the machinery during the maintenance period flows through the controller.

The invention claimed is:

1. A flow rate controller for controlling the flow of a medium, said flow rate controller comprising an incoming channel for the medium, a measuring chamber for a flow meter, a running flow channel connecting the incoming channel and the measuring chamber, a flow adjusting valve with shut-off ability in the running flow channel, and an outflow channel for the adjusted flow, wherein the controller is further provided with: a service flow adjusting channel in parallel with the running flow channel from the incoming channel to the measuring chamber, an adjusting means for adjusting the medium flow from the running flow channel into the service flow adjusting channel, a service flow channel from the service flow adjusting channel to the outflow channel, and a control means for closing the said flow connections to and from the measuring chamber and directing the flow from the service flow adjusting channel into the service flow channel.

2. A flow rate controller as claimed in claim 1, wherein the service flow channel is connected to the running flow channel upstream of the control valve.

* * * * *